United States Patent [19]

Tam

[11] Patent Number: 5,825,351
[45] Date of Patent: Oct. 20, 1998

[54] METHOD AND APPARATUS FOR NOISE FILTERING FOR AN INPUT DEVICE

[75] Inventor: Tommy H. Tam, Mountain View, Calif.

[73] Assignee: Apple Computer, Inc., Cupertino, Calif.

[21] Appl. No.: 559,258

[22] Filed: Nov. 15, 1995

Related U.S. Application Data

[63] Continuation of Ser. No. 241,816, May 12, 1994, abandoned.

[51] Int. Cl.$^6$ ................ G09G 5/00; G09G 5/08
[52] U.S. Cl. ........................... 345/173; 345/157
[58] Field of Search .................. 345/156, 157, 345/159, 173, 174, 177; 178/18, 19

[56] References Cited

U.S. PATENT DOCUMENTS

| | | | |
|---|---|---|---|
| 4,255,617 | 3/1981 | Carau, Sr. et al. | 178/18 |
| 4,454,417 | 6/1984 | May | 345/179 |
| 4,680,429 | 7/1987 | Murdock et al. | 179/19 |
| 5,012,231 | 4/1991 | Felsenstein | 345/159 |
| 5,113,042 | 5/1992 | Mletzko | 178/19 |
| 5,272,469 | 12/1993 | Memarzadeh | 345/173 |
| 5,326,940 | 7/1994 | Doubrava et al. | 178/18 |

*Primary Examiner*—Steven Saras
*Assistant Examiner*—David L. Lewis
*Attorney, Agent, or Firm*—Richard C. Liu

[57] ABSTRACT

A method and apparatus in an electronically controlled system such as a portable computer are provided for minimizing effects of noise picked up by an input device such as a touch-sensitive capacitive coupling input pad where a conductive stylus may be used on the pad to control the cursor movement on a display device. The present invention removes the cursor jitters on the display device that is associated with the input device and provides for quick cursor responses corresponding to quick motion input by the conductive stylus on the input pad.

3 Claims, 2 Drawing Sheets

METHOD AND APPARATUS FOR NOISE FILTERING FOR AN INPUT DEVICE

This is a continuation of application Ser. No. 08/241,816, filed May 12, 1994 now abandoned.

BACKGROUND OF THE INVENTION

1. Field of the Invention

The present invention relates generally to input devices for electronics systems and, more particularly, to a noise filter for a data input device of an electronically controlled system such as a computer system, further in particular, to an electromagnetic noise filter for a capacitive coupling input device.

2. Description of the Related Art

The interactive operation between a computer system and a user typically refers to the user's input actions based upon visual feedback from computer displayed information. For example, through a data input device, a user may choose software options displayed on a computer-controlled display, may elect to move a screen icon from one location of the display to another location of the display or may desire to input data in graphics format (e.g., drawing images on the display) into the computer system.

The advances in computer user-interface technologies have led to the use of an array of data input devices as user-interface devices to effect such interactive operation. These devices include cursor control devices which control the position and movement of a cursor on the screen of an electronically controlled display typically by generating signals indicative of cursor position information and dispatching the signals to drive the display circuits of the display to control the movement of the cursor from its current position in the display to a selected position.

One type of such data input device is commonly referred to as a mouse. In a typical mouse, a hand-held transducer provides position movement signals to the display system. The mouse is coupled to a computer system by a cable and placed adjacent to its keyboard. This typical mouse further contains a domed portion housing a ball which is free to rotate within the dome against a smooth and flat surface, which is typically a desktop. Traditionally, the movement of wheels within the cursor control device is coupled to optical encoders to provide signals indicative of an X-Y position on the display screen.

While the mouse of the type described is satisfactory for many applications, it has been found that a disadvantage associated with mouse is that when using one such device, a relatively large flat surface area is required for mouse movement. This presents particular difficulty for portable computer users who typically operate in an environment having limited space, for example, an airplane, a bus and a train. In addition, the entire hand, elbow and possibly arm have to be used to operate the device. The user must stop his or her hand operation on a keyboard and move his or her hand from the keyboard to grasp the mouse and in order to move the mouse. It sometimes also requires that the user's eyes be shifted from the display to aid in the grasping and moving of the mouse. In many applications (e.g., word processing), the operation of such device results in a substantial loss in convenience and efficiency due to the diversion of the user's attention from the display.

Another type of data input device is commonly referred to as a trackball. This is a data input device actuated by finger movement. A typical trackball device is a hand-held, box-like device having a generally flat upper surface having a cooperating recess thereon in which an actuating ball is located. The ball can be moved by a finger within the cooperating recess. The movement of the ball within the cooperating recess results in production of coordinate control signals which represents the coordinates of the trackball position. The control signals are then used to determine the cursor position on the display.

In addition to being somewhat unreliable because of its many moving parts, another known disadvantage associated with trackball devices is that when a user wishes to place the cursor at a desired spot on the display, the user's finger moves the trackball in a less natural path and in a less intuitive manner where the finger always moves and rides on the ball in arcuate strokes regardless of how the cursor is to arrive at the desired spot on the display. In other words, an arcuate, a straight-lined or any shaped cursor trace on the display is effected only by the user finger's arcuate strokes against the trackball.

One prior solution that solved above problems is described by George Gerpheide in a PCT application, PCT/US90/04584, entitled "Methods and Apparatus For Data Input" filed on 14 Aug. 1990 having a priority date of 16 Aug. 1989. In that application, a touch-sensitive data input device which utilizes capacitive coupling of an object to the device to sense the object's position and movement is disclosed. In one embodiment, a device includes a generally rigid and insulated data input pad having two orthogonal arrays of conductive parallel electrodes. The two orthogonal arrays are disposed on the top and bottom surfaces of the pad and the two arrays being separated by an insulating layer. A circuit associated with the pad electrically connected to the arrays makes capacitive-related measurements on selected portions of the two orthogonal array geometry and tests for capacitively-coupled aberration such as that caused by a finger or a conductive stylus being on or close to the pad. The pad circuit tracks the capacitive aberration as the finger or the stylus moves across the pad and generates corresponding X-Y position and movement information for the cursor on the display. In this way, a user can control the position and movement of a display cursor by moving his finger against the pad. In other words, such a flat-surfaced pad enables an arcuate cursor trace on the display being effected by a corresponding arcuate stroke on the pad and a straight-lined cursor trace being effected by a corresponding straight-lined stroke on the pad. Besides, an operable pad can be small to the extent to allow cursor control by the user's finger without moving the user's wrist which is particularly appealing for users of portable systems.

Therefore, this touch-sensitive input device allows users to interact with an associated computer system: pointing, drawing and moving objects on a display; however, in the process of reading the movement and position of the user finger, the device also picks up noise from its environment. This noise pickup by the input device contributes to the capacitively-coupled aberration caused by the user's finger on the pad as measured and tracked by the pad electronics. Electrical emissions in the ambience, whether they originated from pieces of electrical equipment nearby or sourced by a radio station far away randomly influence the accuracy of the conductive object's location information relative to the pad measured by the pad circuit. For example, this additional and random contribution to the capacitive coupling pad results in jumpy and discontinuous X-Y information being fed to a display for corresponding cursor movement even when the conductive object moves smoothly on and across the pad. Similarly, the noise pickup by the input device causes the cursor on the display to randomly oscillate within a few pixel distance about a position on the display while the cursor is supposed to be stationary at that position. Therefore, under typical system operating conditions, the cursor would exhibit jitters on the display whether it is supposed to be stationary on the display or moving across the display. In addition, such noise pickup can easily mislead the system on the object's location relative to the pad in Z direction whereby confusing the system as to whether or not the object is actually touching the pad.

One solution is to place capacitive coupling devices away from noisy environment but it is not practical in that noise is virtually everywhere. For example, a working light bulb or an AC power source close by radiating electromagnetic waves over a wide range of frequencies would be sufficient for pickup by the capacitive coupling devices. Assuming a user is operating a portable computer with a capacitive coupling input device, along with peripherals and cables, this combination appears, from experimentation, to be susceptible to electromagnetic noise in a typical operating environment for all frequencies but in particular frequencies ranging from 100 KHz to 1.6 MHz. Even when a computer operating room is made free of electromagnetic noise, this room would not be useful for users of portable systems where they carry the systems to places and bound to encounter operating environment having varying degrees of electromagnetic noise. Furthermore, in most instances, computer systems themselves serve as sources of electromagnetic noises which affect their associated input devices regardless of where they are used.

In addition, attempts to eliminate effects of electromagnetic noise pickup such as cursor jitters by making an electronic system in effect less sensitive to the noise content of the input information also in turn cause a cursor on a display to react sluggishly to user input actions, for example, a cursor continues to move on a display while the user had already finished the finger motion on the input pad.

It should be appreciated, however, that a typical data input device that is subject to noise pickup from its environment is not limited only to capacitively-coupling input devices. Furthermore, the noise picked up may not be electromagnetic in nature. For example, mechanical vibrations to an input device can be a part of the noise picked up by an input device and cause cursor jitters. Therefore, regardless of the input device technology practiced, electromagnetic and mechanical noise may be picked up by input devices. It is foreseeable then, in addition to mechanical vibrations, to have input devices be susceptible to electromagnetic noise pickup in frequencies such as the infrared or the optical ranges.

It would be desirable, and is therefore an object of the present invention, to provide a data input device that minimizes the effects of ambient noise on the device.

SUMMARY OF THE INVENTION

From the foregoing, therefore, it is an object to provide a method and an apparatus for superior filtering techniques for minimizing the effects of noise picked up by an input device in an electronically controlled system. It is also an object of the present invention to provide a method and apparatus for noise filtering in a capacitive coupling input device of an electronically controlled system. It is another object of the present invention to provide a capacitive coupling device in a portable computer that removes the effects of ambient noise. It is a further object of the present invention to provide a method and apparatus for eliminating cursor jitters in a computer system. For such a cursor jitter-free system, it is a another object not to have the cursor reacting sluggishly to user input actions.

It is yet another object to provide embodiments of the present invention in an economical and space-saving manner.

These and other objects of the present invention are provided in an embodiment: a portable computer system that has a capacitive coupling input device such as a cursor control pad and its associated circuitry described in the above-referenced PCT publication. The cursor control pad is capacitively-coupled in that cursor position and movement information is obtained by repeatedly comparing capacitive-related measurements made on selected portions of the pad with reference values established by the pad electronics and the geometry of those selected pad portions. Any conductive object such as a finger or a metallic stylus being on or close to the pad would cause aberration from the established reference values. Therefore, by tracking in time the movement of aberration on the pad, the portable computer can in turn generate the desired position and movement information for a cursor of a display device.

The cursor control pad monitors for any conductive object such as a user's finger being on or close to the pad. If the conductive object is detected, the circuitry will track the object by electronically selecting portions of the pad on a regular basis so to generate a series of X-Y information for the object. The X-Y information subsequently undergoes data processing so to remove the jitter effect contributed by the picked-up noise from the environment. The processed position and movement information is then coupled to the display for cursor positioning.

Typically, a current cursor position is based on where the cursor was a unit time earlier and the finger displacement information on the input pad. The processing for minimizing noise effects include data processing techniques that enable generation of a later cursor position information by incorporating a less than full proportion of the displacement information in time into an earlier cursor position information. The amount of data processing applied to the position information determines the cursor responsiveness on the display. When more processing is applied, more noise is eliminated, but more sluggish (less responsive) the cursor reacts to user input actions. On the other hand, when less processing is applied, less noise is eliminated, but less sluggish (more responsive) the cursor reacts to user input actions. For a user, however, cursor responsiveness is less important when the user intends slow cursor movement whereas the responsiveness is more important when the user intends quick cursor movement. Therefore, the cursor control pad provides circuitry that analyzes the displacement information in time between earlier X-Y position information and later X-Y position information. If the analysis indicates quick cursor movement, then less processing can be applied. But if the analysis indicates slow cursor movement, then more processing should be applied.

BRIEF DESCRIPTION OF THE DRAWING

A objects, features and advantages of the present invention can be obtained by considering the following detailed description taken together with the accompanying drawings in which.

DETAILED DESCRIPTION

Figure 1:
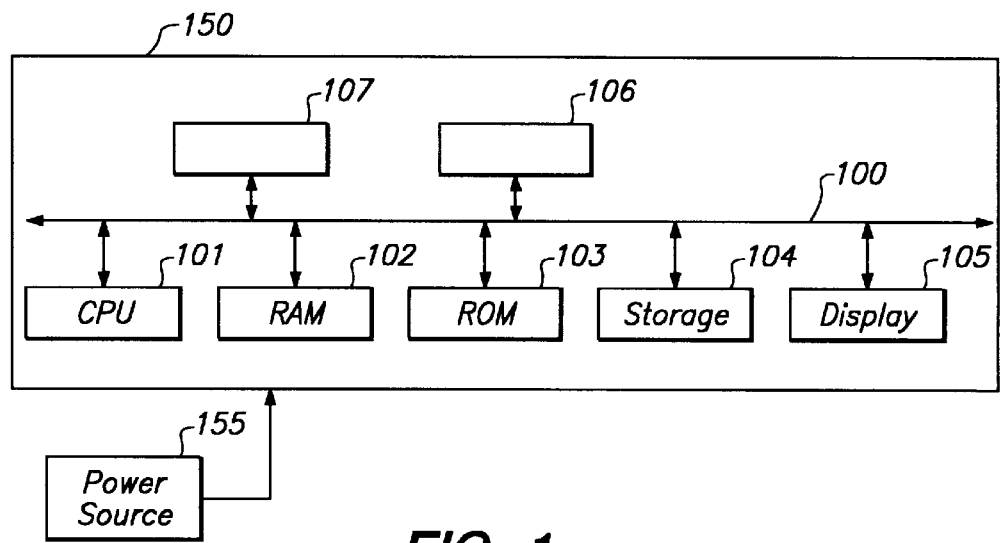
FIG. 1 illustrates a block diagram of a computer architecture incorporating the present invention.

A method and apparatus are described for noise filtering for a capacitive coupling input device in one embodiment of a portable computer system. The particular electronic implementation of the present invention should not be seen as limiting because the present invention may be suitable for use in any electronically controlled system having a data input device that is subject to noise pickup. Throughout this detailed description numerous details are set forth in order to provide a thorough understanding of the present invention. To one skilled in the art, however, it will be appreciated that the present invention may be practiced without such specific details. In other instances, well-known methods, control structures and gate level circuits have not been shown in detail in order not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. Unless specifically stated otherwise as apparent from the following discussions, it is appreciated that through the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. In addition, with today's device technology, the development of specialized integrated circuits and programmable logic generally do not require the rendering of fully detailed circuit diagrams. The definition of logic functionality and state diagrams allow computer design techniques to design the desired logic and circuits. Accordingly, portions of the present invention will be described primarily in terms of functionality to be implemented by a microcontroller and other associated electronic components. This functionality will be described in detail with the associated flow diagram. Those of ordinary skill in the art, once given the following descriptions of the various functions to be carried out by the present invention will be able to implement the necessary microcontroller structure and various logic devices including custom designed integrated circuits in suitable technologies without undue experimentation.

Also, a portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyrights whatsoever.

FIG. 1 is a block diagram of a computer system 150 in which the present invention may be practiced. The system comprises a bus 100 for communicating information, a central processor 101 coupled to the bus for processing information and instructions, a random access memory (RAM) 102 coupled to the bus 100 for storing information and instructions for the central processor 101, a read only memory (ROM) 103 coupled to the bus 100 for storing static information and instructions for the processor 101, a data storage device 104 such as a magnetic disk and disk drive coupled to the bus 100 for storing information and instructions, an alphanumeric input device 106 including alphanumeric and function keys coupled to the bus 100 for communicating information and command selections to the central processor 101, a display device 105 coupled to the bus 100 for displaying information to the computer user which may be a liquid crystal device, cathode ray tube, or other display device suitable for creating graphic images and alphanumeric characters (and ideograph character sets) recognizable to the user, a capacitive coupling cursor control device 107 incorporating the present invention coupled to the bus 100 for communicating user input information and command selections to the central processor 101, this cursor control device 107 further allowing the computer user to dynamically signal the two dimensional movement of a visible marking on a display screen of the display device 105 such as a cursor or a pointer, and a power source 155 for providing power to the system 150. In one embodiment of the present invention, the power source 155 includes an adapter for AC voltage line; in another preferred embodiment, it may be a removable, rechargeable battery pack which in turn includes one or more batteries and can be removed easily by the user and replaced with the same or similar batteries.

Figure 2:
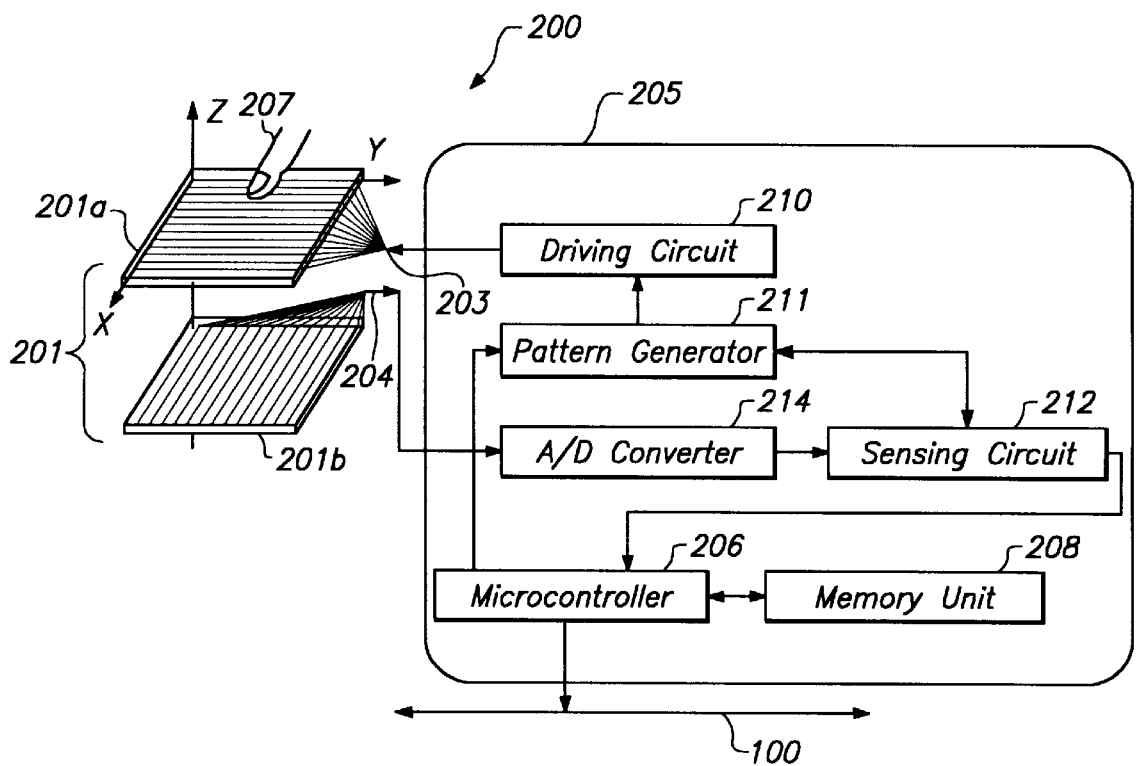
FIG. 2 illustrates a simplified view of a block diagram of the capacitive coupling cursor control device in FIG. 1 in accordance with the present invention.

Referring now additionally to FIG. 2 which illustrates a simplified block diagram of an embodiment of the capacitive coupling cursor control device 107 in accordance with the present invention. An input subsystem 200 comprises an input pad 201 and an associated pad circuit 205. The input pad 201 may be made out of a PCB material or any rigid-to-touch material that is electrically insulated and wear resistant on its outer periphery. For this embodiment, the input pad 201 is an integral combination of two sub-pads 201a and 201b wherein an array of parallel electrodes is disposed on each of the opposite surfaces of the sub-pads 201a and 201b. A first array of parallel electrodes 203 is associated with the sub-pad 201a whereas a second array of parallel electrodes 204 being orthogonal to the first array is associated with the sub-pad 201b. In another embodiment, the two arrays of electrodes 203, 204 do not have to be orthogonal in configuration; they can criss-cross each other in an angle other than 90 degrees. Also, instead of being parallel to each other, the electrodes on each of the two arrays 203, 204 may be disposed on the input pad 201 with configurations including concentric circles, squares, rectangles or others. The sub-pads 201a and 201b are illustrated apart from each other in the Figure for clarity purposes but in practice the two sub-pads are integrated together allowing the pad rigidity to maintain a constant separating distance in the Z direction between the two arrays 203, 204. Another preferred embodiment for this input pad is a single rigid, non-conductive pad having two orthogonal arrays of parallel electrodes disposed on either surface of the pad or embedded in the pad. The input pad 201, in conjunction with the pad circuit 205 to be described hereinafter, allows any conductive stylus such as a user's finger 207 to control the cursor movement on the display device 105 of system 150 by moving the finger 207 against and across the input pad 201 in the X and/or Y direction.

The pad circuit 205 comprises a microcontroller 206, a memory unit 208, a driving circuit 210, a pattern generator 211, a sensing circuit 212 and an analog-to-digital (A/D) converter 214. The driving circuit 210 electrically couples to the first array of parallel electrodes 203 of the input pad 201 and electrically energizes a selected portion of the first array of electrodes 203 in a predetermined manner stipulated by the pattern generator 211. The pattern generator 211 under the control of the microcontroller 206 electrically indicates to the driving circuit 210 as to the portions of the input pad 201 to be energized. In fact, the pattern information is similarly coupled to the sensing circuit 212 for subsequent reading capacitive values from the input pad 201 and calculating position information for the user's finger 207. Selection patterns stipulated by the pattern generator 211 for electrical energization of the input pad 201 include applying positive and negative charges to alternate electrodes of a selected portion of the first array of the parallel electrodes 203. These patterns are generated by the pattern generator 211 and in another embodiment, they may also be generated in the pattern generator 211 in conjunction with the memory unit 208 such as a ROM or an EPROM.

The A/D converter 214 receives pad information including the X-Y-Z information in analog form from the input pad 201 and transforms it into digital format for further processing. In practice, this A/D converter 214 may be a stand alone circuit or be incorporated into either the sensing circuit 212 or the driving circuit 210. The digitized pad information is subsequently coupled to the sensing circuit 212 for extracting therefrom the X-Y-Z information of the user's finger 207 relative to the input pad 201. In one embodiment, the microcontroller 206 receives the X-Y-Z information from the sensing circuit 212 for determining the presence of the user's finger 207 on the pad 201, and for processing to reduce noise contribution in the X-Y information before delivering it via the system bus 100 to the display device 105 for executing corresponding cursor movement. In another embodiment, a number of functions found in the microcontroller 206 such as testing for the finger's presence, may be incorporated into the sensing circuit 212. In yet another preferred embodiment, while the microcontroller 206 processes the X-Y-Z information, it is delivered to the memory unit 208 for storage for transmission at a later time.

The sensing circuit 212, in another configuration, is electrically coupled to the second array of parallel electrodes 204 of the input pad 201 and makes analog capacitive measurements on that selected portion energized by the driving circuit 210. The information produced in the sensing circuit 212 is then fed to the A/D converter 214 for digitization before being delivered to the microcontroller 206 for further processing.

Regardless of the implementation, when the selected portion of the first array of electrodes 203 is electrically energized, such energization in view of the geometry of the selected portion of the input pad 201 allows the sensing circuit 212 to make capacitive measurements. Because any capacitive measurement for the present invention is a function of the pad geometry and composition of that selected portion, therefore, any conductive object on or close to that selected pad portion would capacitively couple to that portion and cause the associated capacitive measurements to veer away from the measured values had the conductive object not been there. While not wishing to be bound by theory, the aforementioned published PCT application (PCT/US90/04584) which is hereby incorporated by reference, does provide an in-depth analysis on how tracking the capacitive aberration on selected pad portions translates into X-Y-Z information for a conductive object as it moves on and across an input pad. Accordingly, the sensing circuit 212 in addition to measuring capacitive values on selected pad portions, it also calculates a number of capacitive-related values based on those measurements so to enable the tracking of the movement of the user's finger 207 on the input pad 201 and the generating of position information including X-Y-Z information for the moving finger 207. As discussed earlier, this X-Y-Z information includes contribution by the noise randomly picked up by the capacitive coupling input pad 201.

Figure 3:
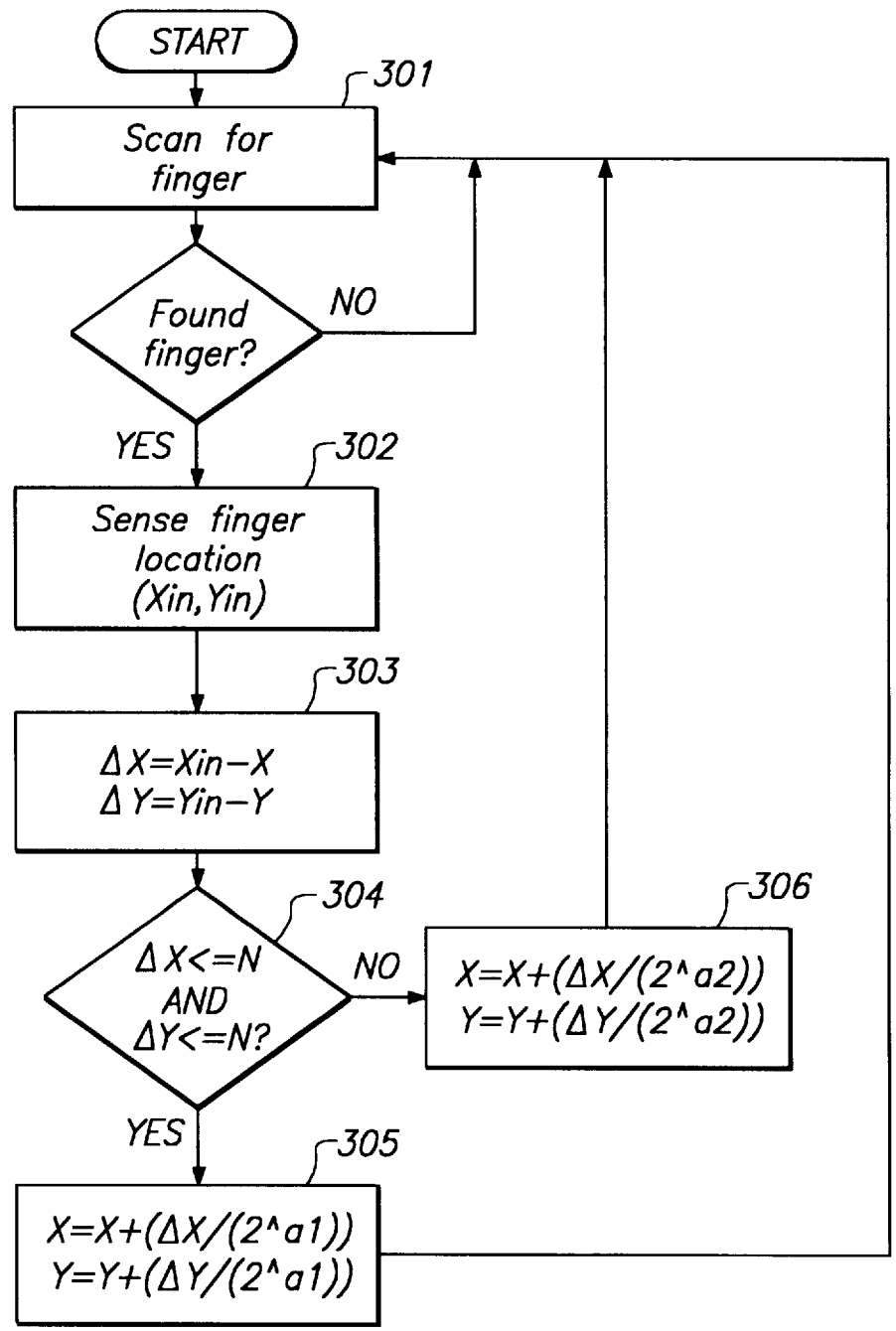
FIG. 3 illustrates a general flow diagram for noise filtering process in the capacitive coupling input device in FIG. 2 in accordance with the present invention.

Referring now additionally to FIG. 3 which illustrates a general flow diagram for noise filtering in the input subsystem 200 of FIG. 2 in accordance with the present invention. In step 301, the microcontroller 206 according to the incorporated PCT application processes the pad's X-Y-Z information in order to scan for the presence of the user's finger 207. In one embodiment, the position information in the Z direction is analyzed for the presence of the user's finger 207. If the user's finger 207 is not detected on or being dose to the input pad 201, then the driving circuit 210, the sensing circuit 212 and the A/D converter 214 are caused to continue scanning for any conductive object by energizing selected portions of the input pad 201, by making capacitive-related measurements and by processing the resulting X-Y-Z information including testing for presence of any conductive object on the pad 201. Also, if the user's finger 207 is not found, the X-Y information fed to the microcontroller 206, if any, would be ignored. On the other hand, if the user's finger 207 on the input pad 201 is detected by the pad circuit 205, then the X-Y information for the user's finger 207 is obtained by the microcontroller 206 in step 302 in accordance with the above-incorporated PCT publication. However, if this X-Y information were to be delivered unfiltered to the display device 105 via the system bus 100 for corresponding cursor movement control, the portion in the X-Y information caused by the noise picked up by the capacitive coupling input pad 201 would in turn cause the undesirable cursor jitters on the display device 105.

A way to eliminate the random and discontinuous fluctuation of the X-Y information in time is to provide processing techniques which as a result systematically and arbitrarily makes displacement information, $\Delta X$ or $\Delta Y$, between a earlier piece of X-Y information, Xearlier or Yearlier, and a later piece of X-Y information, Xlater or Ylater, smaller than what it really is. As a consequence, this displacement downsizing shortens the corresponding cursor movement in between X-Y information samples. This also translates into a proportional downsizing of the contribution in the X-Y information due to the picked up noise whereby eliminating cursor jitters. But as discussed earlier, the corresponding cursor may become undesirably sluggish on the display device 105 as more noise is being eliminated. However, by understanding the way a user moves a cursor on a display and the way the cursor jitters due to noise, it is possible to design a noise filter to eliminate cursor jitters and not having the cursor to appear sluggish to the user. Depending on what the user is trying to accomplish with the system, the user moves the cursor on the display sometimes quickly and sometimes slowly. Typically, when he is trying to go from one end of the display screen to the other, or when he is moving an object on the screen for a long distance, his motion would be quick. On the other hand, when he is trying to pinpoint the cursor to an exact location such as in text editing or graphical drawing, his motion would be slow. In general, the level of cursor positioning accuracy required for quick movement and slow movement is different. For quick movement, accuracy is less important while fast response time is critical. For slow movement, the user will pay more attention to the accuracy while he is less concerned about the response time. The present invention satisfies both requirements as described above, for example, it keeps the cursor at the same position on the display 105 if the finger 207 is stationary on the capacitive coupling pad 107; it also provides the cursor to have quick response when the finger moves quickly on the pad.

Displacement information, $\Delta X$ and $\Delta Y$, which is indicative of the distance that the user's finger 207 has traveled since the last finger location sample, can then be computed by the microcontroller 206 using user finger's X-Y information obtained in the step 302. This information is useful because a typical method for obtaining current finger position is to sum previous finger position and finger displacement from the previous finger position. However, since noise picked up by the input pad 201 randomly affect the magnitude of the displacement information, therefore data processing techniques including statistical averaging and time averaging methods can be applied to the current finger position calculation in order to remove the random contribution made by the noise. Regardless of the process used, the result of which incorporates less than full weight of the displacement information into the previous finger position for computing the current finger position. One way of computing the displacement information is found in step 303 where $\Delta X$ is the difference between the current X position as found by the step 302 and an earlier processed X position and where $\Delta Y$ is the difference between the current Y position as found by the step 302 and an earlier processed Y position.

The displacement information can be quantified in a number of ways. One way is to provide a numbering system where a unit digit corresponds to one pixel length. In another preferred numbering system, several unit digits represent a single pixel length. In yet another preferred numbering system, the system incorporates the variable scaling concept. For such a system, a displacement of ten may correspond to a ten-pixel length whereas a displacement of five may only correspond to a one-pixel length. Thus, using an arbitrarily selected numbering system, when the finger 207 is moving quickly on the input pad 201, the displacement information would record larger values than that if the finger 207 were moving slower on the input pad 201. Since the finger that moves slowly for fine control can less tolerate the effects of noise pickup and can better withstand a slower cursor response, therefore, data processing techniques as a result of which provide more noise effect filtering can be applied to the X-Y information than that if the finger were to move quickly.

In order to determine the quickness or slowness of finger motion, the calculated displacement information from the step 303 is categorized relative to the speed of the user's finger 207 on the pad 201, meaning, larger the displacement value, quicker the finger movement and smaller the displacement value, slower the finger movement. If the indication is that the finger motion is faster than a predetermined speed, then processing techniques are applied which as a result would not reduce the actual displacement as much as that if the finger motion were slow. This is due to the fact that cursor responsiveness is more important when the user intends quick cursor movement whereas the responsiveness is less important when the user intends slow cursor movement. One way to implement this categorization is to utilize a look up table providing varying parameter values according to the speed of the finger motion. In another embodiment, referring now to steps 304, 305 and 306 of FIG. 3, a two-category test is provided. If $\Delta X$ and $\Delta Y$ are greater than N, a predetermined threshold value for finger speed, then the finger motion is considered quick, otherwise, slow. N is an arbitrary value dependent upon the numbering system used for quantifying the displacement information. Once that number system is stipulated, the value for N can be determined easily without undue experimentation. For both categories, data processing techniques which as a result would incorporate less than full proportion of the displacement information for calculating current pad X-Y information are applied. But for the quick finger motion, the proportion value is larger than that of the slow finger motion; in other words, a quick finger motion on the input pad would elicit a correspondingly quick cursor response on the display device, and a slow finger motion including a finger being stationary on the pad would provide a corresponding and jitter-free cursor response on the display device. In order to eliminate the effects of the picked up noise, a method is being described here, but it is equally possible to render the method taught here into an apparatus implementation using existing technologies.

According to one embodiment, once the finger speed on the pad is determined to be slow, then the filtering processing applied follows the equations $x_{later}=x_{earlier}+(\Delta x/2^{a1})$ and $y_{later}=y_{earlier}+(\Delta y/2^{a1})$, if the finger speed is determined to be quick, then the equations to apply are $x_{later}=x_{earlier}+(\Delta x/2^{a2})$ and $y_{later}=y_{earlier}+(\Delta y/2^{a2})$ where a1>0, a2$\geq$0 and a1>a2. All of equations, other when a2=0, place a less than full proportion of the displacement information for calculating current finger position on the input pad. Because a1 is greater than a2, the noise filtering is more extensive with respect to the slow finger motion. Again, a1 and a2, like N, are values which can be arbitrarily determined without undue experimentation. After generating the updated and noise-filtered finger position information, the control is again directed to scan for the next finger location on the input pad. This may be a process that repeats itself in an infinite loop. What is not shown on FIG. 3 is that while the $X_{later}$ and $Y_{later}$ information becomes the $X_{earlier}$ and $Y_{earlier}$ information for calculating the next finger location information, the resulting $X_{later}$ and $Y_{later}$ information is then fed to the display device 105 via the system bus 100 by the microcontroller 206 for cursor movement corresponding to the updated and noise-filtered finger position information.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer system comprising:

a CPU for executing instructions and processing data;

a display subsystem coupled to said CPU wherein said display subsystem includes a display screen and a display driving circuit which receives and executes instructions from said CPU for moving a displayed marking on said display screen;

an input subsystem including an input pad for displayed marking movement information input by a user using a conductive stylus moving it against said input pad, said input pad having two conductive layers disposed on said input pad having a constant separation therebetween and said input pad having a pad circuit coupled to said input pad for determining location information of said conductive stylus on said input pad by repeatedly comparing measured capacitively-related values on selected portions of said input pad with reference values related to said selected portions of said input pad, said location information being in electronic and digital format and being representative of said marking movement information;

a noise filter coupled to said input subsystem and said CPU for receiving said location information, and for processing said location information for removing effects of noise picked up by said input subsystem whereby the noise filter is operatively sensitive to the speed of said conductive stylus and the noise filter generates and uses displacement information indicative of how far said conductive stylus had traveled in time for generating processed location information wherein a later piece of said processed location information is a function of an earlier piece of said processed location information and a selected proportion of said displacement information, the selected proportion used depending on the value of said displacement information, the processed location information being subsequently coupled to said display subsystem under the control of said CPU for moving said displayed marking on said display screen;

said two conductive layers being disposed on either side of said input pad, said layers further comprising:
  a first array of conductive parallel strips electrically coupled to a driving circuit of said pad circuit for establishing capacitive values for said input pad;
  a second array of conductive parallel strips disposed orthogonal to said first array, said second array of conductive strips being electrically coupled to a sensing circuit of said pad circuit for measuring said capacitive values for said input pad; and
  wherein said driving circuit and said sensing circuit repeatedly select portions of said input pad for detecting and tracking capacitive aberration caused by said conductive stylus as it moves across said input pad, said capacitive aberration being related to the difference between said established capacitive values and said measured capacitive values;

said input pad being insulated and rigid to touch;

said noise filter generating and using displacement information indicative of how far said conductive stylus had traveled in time for generating said processed location information, said noise filter further generating a later piece of said processed location information by incorporating a proportion of said displacement information into an earlier piece of said processed location information, said noise filter further using a number of values for said proportion of said displacement information, a use of any particular value out of said number of values depending on the value of said displacement information;

wherein said later piece of said processed location information, $X_{later}$ and $Y_{later}$, are derived according to the following rules:

$X_{later} = X_{earlier} + (\Delta X/2^n)$ and
$Y_{later} = Y_{earlier} + (\Delta Y/2^n)$ where n >0, $\Delta X$ is the value of said displacement information in time in the X direction and $\Delta Y$ is the value of said displacement information in time in the Y direction and where both $\Delta X$ and $\Delta Y$ are less than A, a number equal to or below which indicating said conductive stylus moving across said input pad slowly; and $X_{later} = X_{earlier} + (\Delta X/2^m)$ and
$Y_{later} = Y_{earlier} + (\Delta Y/2^m)$ where m $\geq$ 0 and n >m, and where $\Delta X$ or $\Delta Y$ is greater than A, a number over which indicating said conductive stylus moving across said input pad quickly.

2. An electronic apparatus comprising:

a CPU;

a subsystem of said electronic apparatus operatively coupled to said CPU wherein said subsystem receives and executes instructions from said CPU;

an input subsystem of said electronic apparatus including an input pad for instruction information input by a user using a conductive stylus moving it against said input pad, said input pad having two conductive layers disposed on said input pad having a constant separation therebetween, and said input pad having a pad circuit coupled to said input pad for determining location information of said conductive stylus on said input pad by comparing measured capacitively-related values on selected portions of said input pad with reference values related to said selected portions of said input pad, wherein said location information being in electronic and digital format and being representative of said user-input instruction information;

a noise filter coupled to said input subsystem and said CPU for receiving said location information, for providing displacement information indicative of how far said conductive stylus had traveled in time on said input pad and for processing said location information for removing effects of noise pickup by said input subsystem;

wherein said noise filter generates a later piece of said processed location information by incorporating a proportion of said displacement information into an earlier piece of said processed location information and that the value of said proportion depends on value of said displacement information;

further wherein said noise filter generates processed location information which is coupled to said subsystem for execution of said user-input instruction information;

said two conductive layers being disposed on either side of said input pad, said layers further comprising:
  a first array of conductive parallel strips electrically coupled to a driving circuit of said pad circuit for establishing capacitive values for said input pad;
  a second array of conductive parallel strips disposed orthogonal to said first array, said second array of conductive strips being electrically coupled to a sensing circuit of said pad circuit for measuring said capacitive values for said input pad; and
  wherein said driving circuit and said sensing circuit repeatedly select portions of said input pad for detecting and tracking capacitive aberration caused by said conductive stylus as it moves across said input pad, said capacitive aberration being related to the difference between said established capacitive values and said measured capacitive values;

wherein said later piece of said processed location information, $X_{later}$ and $Y_{later}$, are derived according to the following rules:

$X_{later} = X_{earlier} + (\Delta X/2^n)$ and
$Y_{later} = Y_{earlier} + (\Delta Y/2^n)$ where n >0, $\Delta X$ is the value of said displacement information in time in the X direction and $\Delta Y$ is the value of said displacement information in time in the Y direction and where both $\Delta X$ and $\Delta Y$ are less than A, a number equal to or below which indicating said conductive stylus moving across said input pad slowly; and $X_{later} = X_{earlier} + (\Delta X/2^m)$ and
$Y_{later} = Y_{earlier} + (\Delta Y/2^m)$ where m $\geq 0$ and n >m, and where $\Delta X$ or $\Delta Y$ is greater than A, a number over which indicating said conductive stylus moving across said input pad quickly.

3. The electronic apparatus in claim 2 wherein said input subsystem is a stand alone unit.

* * * * *